No. 669,428. Patented Mar. 5, 1901.
W. H. PAINE.
COIN ACTUATED FLUID DISPENSING MECHANISM.
(Application filed Mar. 14, 1900.)
(No Model.)
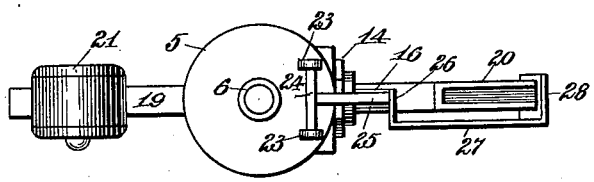
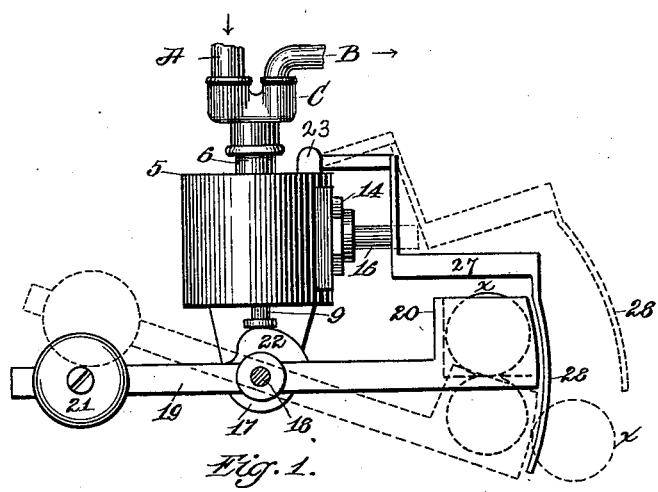
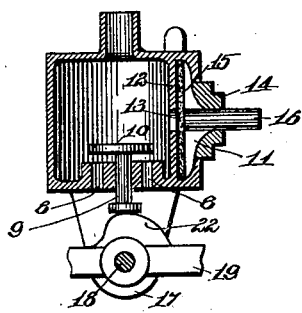
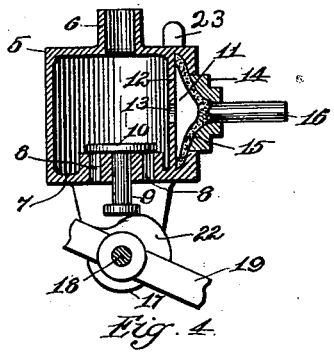

UNITED STATES PATENT OFFICE.

WILLIAM HOWARD PAINE, OF PROVIDENCE, RHODE ISLAND, ASSIGNOR TO AUTOMATIC TIRE INFLATOR COMPANY, OF SAME PLACE.

COIN-ACTUATED FLUID-DISPENSING MECHANISM.

SPECIFICATION forming part of Letters Patent No. 669,428, dated March 5, 1901.

Application filed March 14, 1900. Serial No. 8,587. (No model.)

*To all whom it may concern:*

Be it known that I, WILLIAM HOWARD PAINE, a citizen of the United States, residing at Providence, in the county of Providence and State of Rhode Island, have invented a certain new and useful Improvement in Coin-Actuated Mechanism, of which the following is a specification, reference being had therein to the accompanying drawings.

This invention has reference to improvements in coin-actuated mechanism particularly adapted for use in connection with fluid-dispensing devices.

One object of the invention is to so construct a coin-actuated attachment for devices from which fluid is dispensed under pressure that the reduction of pressure will automatically bring into action controller mechanism whereby the course of the fluid is changed.

Another object of the invention is to so construct a coin-actuated mechanism for fluid-dispensing devices that a by-path is normally provided for the fluid.

Another object of the invention is to provide a novel coin-actuated mechanism for fluid-dispensing devices whereby a coin-guard is actuated through means operative by the pressure of the fluid.

The invention consists of a detector chamber or receptacle adapted to be connected in the path of the fluid under pressure and furnished with a valve operative by coin-actuated mechanism.

The invention also consists in a normally open receptacle for receiving fluid under pressure and a coin-actuated controller for controlling the delivery of fluid from such receptacle.

The invention also consists in a pressure-chamber having an inlet and an outlet, a valve for controlling the outlet, and a coin-actuated mechanism for operating the valve.

The invention also consists in the construction of the coin-actuated mechanism and in its combination with the valve and the pressure-chamber.

The invention also consists in the means for operating the coin-guard.

The invention also consists in a chamber having an inlet which is adapted to be connected with a fluid-supply conduit, and an outlet, a valve for closing the outlet, a coin-actuated mechanism for controlling the valve, together with a coin gate or guard pivotally mounted, and means operative by pressure within the chamber for moving the gate or guard.

The invention also consists in such other novel features of construction and combination of parts which shall hereinafter be more fully described, and pointed out in the claims.

In the drawings, Figure 1 represents an elevation of the improved coin-controlled mechanism partially in section. Fig. 2 represents a plan view of the same. Fig. 3 represents a vertical sectional view of the pressure-chamber, showing the valve in the open position and the coin-gate lifter in its normal position. Fig. 4 represents a similar view of the pressure-chamber, showing the valve closed.

Similar characters of reference designate corresponding parts throughout.

In carrying my invention into practice it has been my desire to so construct a detector and controller device adapted for use in connection with bicycle-pumps and other machines for dispensing fluids under pressure that normally a by-path is provided for fluid passing from the pump-cylinder or other reservoir or fluid-container, that under the action of suitable coin-actuated mechanism the by-path will be closed and the fluid directed through the delivery pipe or conduit, and that upon the reduction of pressure the by-path may be automatically opened and the coin mechanism reset.

In one class of mechanism to which this device is particularly adapted—namely, that in which fluid is supplied under pressure for inflating bicycle or similar tires—the fluid is either stored under pressure in a reservoir or a pump is provided for exerting pressure on air or other fluid. From the reservoir or pump-cylinder a delivery-pipe extends to a point convenient for attachment to a tire inlet-valve, some movable part of the apparatus being controlled by a coin-actuated mechanism.

In mechanism of the general class herein referred to many expedients are resorted to by users to obtain an unpaid-for amount of the fluid, and one of the main objects of this invention is to overcome the possibility of such course of action. The specific mechanism to which I do not, however, restrict myself, whereby this invention is carried out, comprises a pressure-chamber 5, having the inlet 6 adapted for connection with the delivery-conduit of any pressure-reservoir or pump-cylinder, so that as the fluid under pressure passes through the conduit herein represented by the pipes A and B and their union C the fluid will pass through this chamber. In the bottom 7 of the chamber are several outlets or by-paths, as 8 8, the aggregate area of which exceeds that of the inlet 6, and in the bottom is reciprocally mounted the stem 9 of the valve 10, which valve is adapted to close the outlets 8 8 when dropped.

At one side of the chamber 6 is formed a compartment 11 by means of the partition 12 with its perforation 13 and the perforated screw-plug 14 secured in an opening in the wall of the chamber 5, and in this compartment 11 is secured a flexible diaphragm 15, provided with the rod 16, which is reciprocal through the perforation in the plug 14.

From the chamber 5 depend brackets 17, between which is mounted the shaft 18, and on this shaft is journaled the coin-lever 19, having at one end the coin-pocket 20, open at the top and on the outer end, and on the other end of the coin-lever is adjustably mounted the counterweight 21, while intermediate of its length this lever is furnished with the cam 22, shaped to support the valve-stem 9 normally in the position shown in Fig. 3 and to allow this stem to drop to the position shown in Fig. 4, when the pocket end of the lever is depressed. The top of the pressure-chamber has the ears 23 23, between which is pivoted the pintle 24, having the rod 25 with the depending plate 26 and the extension 27, carrying the curved coin gate or guard 28. The plate 26 bears against the outer end of the diaphragm-rod 16 and the coin-gate closes the open end of the coin-pocket 20 on the lever.

Reference to the drawings will show that all fluid passing into the chamber will under normal conditions pass out through the outlets 8 8, and no fluid will be supplied to the pipe B. When a coin $x$ of suitable weight, directed to this position by any well-known means, is placed in the coin-pocket 20, the weight depresses this end of the lever 19. The cam 22 allows the valve-stem 9 and its valve to move to the closed position, as in Fig. 4. Fluid now entering the chamber 5 under pressure will first pass through the perforation 13 in the partition 12, causing the outward deflection of the diaphragm 15, thus moving outward the rod 16 and effecting the upward swinging of the coin-gate 28 and the release of the coin $x$ from the pocket. The pressure within the chamber 5 under the last-described conditions of course tends to hold the valve 10 depressed against the action of the counterweight 21 and its lever and cam. If now the pressure within the chamber be reduced from any cause—suppose by the release of the pipe B from connection with one tire in an attempt to attach it to another tire while the operation of the pump is continued—the counterweight 21 will overcome the resistance of the reduced pressure in the chamber, this end of the coin-lever will be depressed, the valve-stem 9 will ride up over the cam 22, and the valve 10 will be raised to open the outlets 8 8. At the same time the diaphragm 15 will snap back to its normal position and the coin-gate will drop back to place.

This device may be adjusted to extremely sensitive action and is adapted for use in combination with a large variety of mechanisms.

It is understood that the detector pressure-chamber herein described is supplemental to the pressure-chamber for storing the fluid, and that I do not confine myself to the specific construction herein described.

Having thus described my invention, I claim as new and desire to secure by Letters Patent—

1. A normally open fluid by-path, and means, operative through connection with coin-actuated mechanism, for closing and opening the same.

2. A supplemental detector-chamber, adapted for connection with a fluid-pressure delivery, having an outlet, a valve having a stem working through a perforation in the wall of the chamber for closing the outlet, and a coin-lever pivotally mounted adjacent to the outer end of the valve-stem and operatively associated therewith.

3. The detector-chamber having the inlet and the outlets, the valve for controlling the outlets, the coin-lever pivotally mounted below the chamber and having the cam operatively associated with the valve-stem.

4. The detector-chamber having the side compartment with its perforated partition, the flexible diaphragm within the compartment and having the rod working through a perforation, in combination with a coin-gate adapted to be operated by said rod, and a coin-support adjacent thereto.

5. The combination with the chamber 5 having the inlet 6 and the outlets 8 8, the valve-stem 9 working in a perforation in the wall of the chamber and having the valve 10 for closing the outlets, and coin-actuated mechanism for supporting the valve-stem under predetermined conditions.

6. The combination with the chamber 5 having the inlet 6 and the outlets 8 8, and the valve 10 for closing said outlets, the stem 9 of which works through a perforation in the wall of the chamber of the brackets 17, and the lever 19 pivotally supported therebetween and having the cam 22 bearing against the lower end of the valve-stem.

7. The combination with the chamber 5 having a valved opening, and furnished with the perforated partition 12 and the perforated screw-plug 14, the flexible diaphragm 15 in the compartment thus formed, and the rod 16 secured to the diaphragm and working through the perforation in the plug 14, of a coin-gate movably mounted and bearing against said rod, and a coin-receptacle with which the coin-gate coacts.

In testimony whereof I affix my signature in presence of two witnesses.

WILLIAM HOWARD PAINE.

Witnesses:
W. STANLEY CAMPBELL,
HENRY J. MILLER.